(12) United States Patent
Gaudig

(10) Patent No.: US 9,676,341 B2
(45) Date of Patent: Jun. 13, 2017

(54) CENTER CONSOLE FOR A MOTOR VEHICLE AND MOTOR VEHICLE HAVING SUCH A CENTER CONSOLE

(71) Applicant: GM GLOBAL TECHNOLOGY OPERATIONS LLC, Detroit, MI (US)

(72) Inventor: Ralf Gaudig, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 20 days.

(21) Appl. No.: 14/743,414

(22) Filed: Jun. 18, 2015

(65) Prior Publication Data

US 2015/0367783 A1    Dec. 24, 2015

(30) Foreign Application Priority Data

Jun. 18, 2014    (DE) .......................... 10 2014 008 717

(51) Int. Cl.
*B60R 13/00*   (2006.01)
*B60R 7/04*    (2006.01)
*B60N 2/46*    (2006.01)

(52) U.S. Cl.
CPC .............. *B60R 7/04* (2013.01); *B60N 2/4606* (2013.01); *B60N 2/4646* (2013.01)

(58) Field of Classification Search
CPC ........ B60R 7/04; B60N 2/4605; B60N 2/4646
See application file for complete search history.

(56) References Cited

FOREIGN PATENT DOCUMENTS

| DE | 10151704 A1 | 5/2003 | |
|---|---|---|---|
| DE | 10164340 C1 * | 10/2003 | .............. B60R 7/04 |
| DE | 102005055138 A1 | 5/2007 | |

OTHER PUBLICATIONS

German Patent Office, German Search Report for German Application No. 102014008717.4, dated Feb. 4, 2015.

* cited by examiner

*Primary Examiner* — Lori L Lyjak
(74) *Attorney, Agent, or Firm* — Lorenz & Kopf LLP

(57) ABSTRACT

A center console for a motor vehicle includes a stowage compartment with a stowage compartment aperture. A stowage compartment lid is positionable from a closed position, in which the stowage compartment lid covers the stowage compartment aperture, into an open position, in which the stowage compartment lid opens the stowage compartment aperture. The stowage compartment lid can be pivoted about a first pivot axis extending in longitudinal direction in a first pivot direction from the closed position into the open position. The present disclosure furthermore relates to a motor vehicle with such a center console.

16 Claims, 4 Drawing Sheets

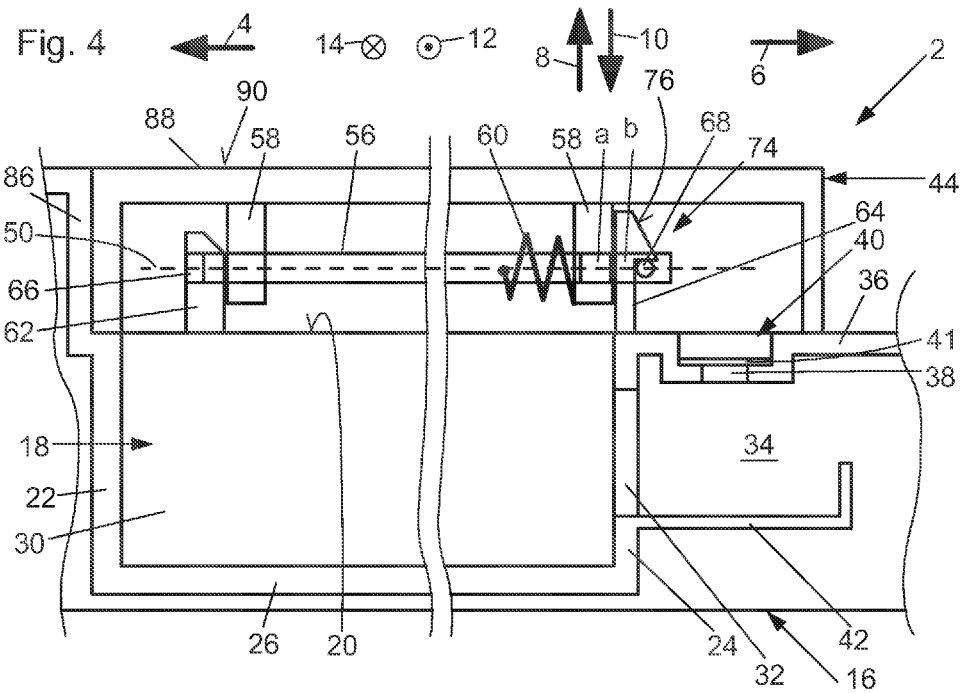
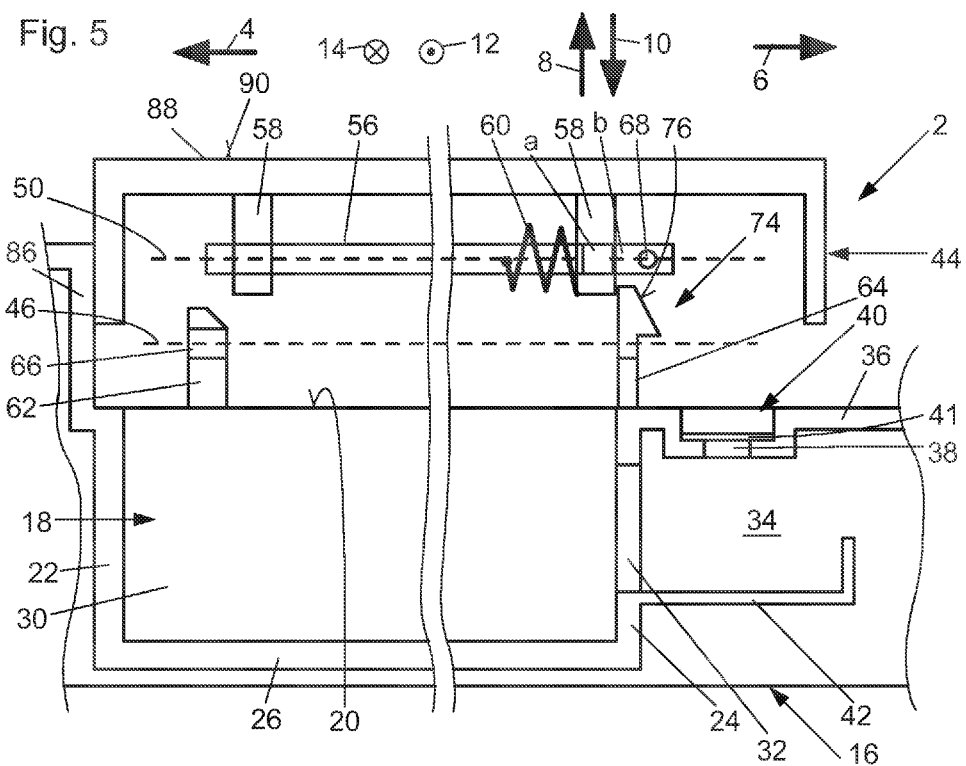

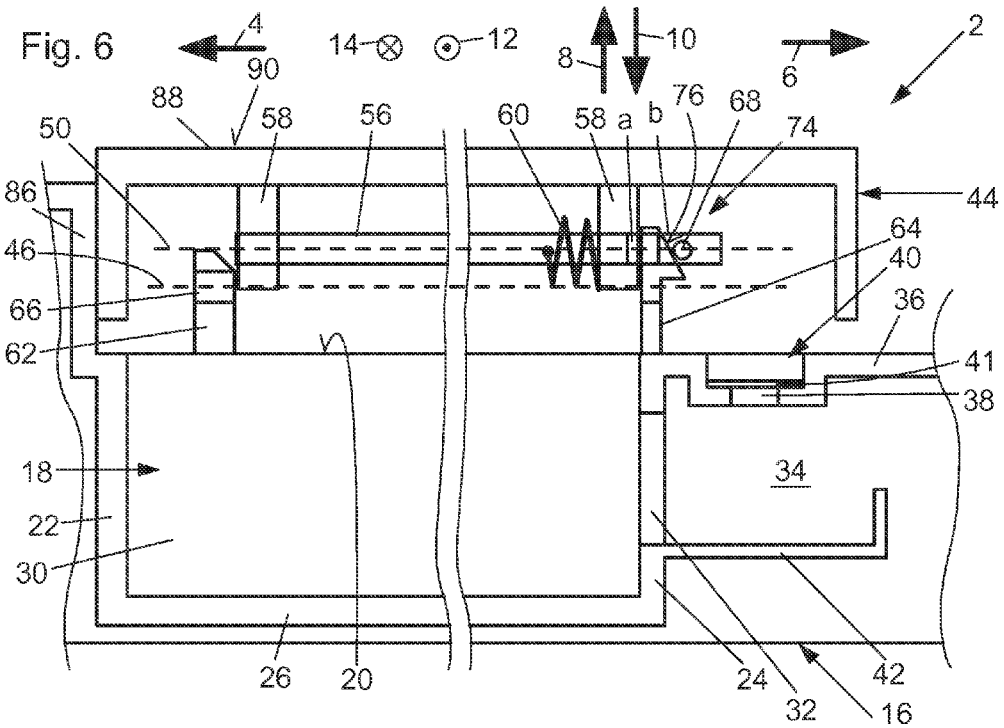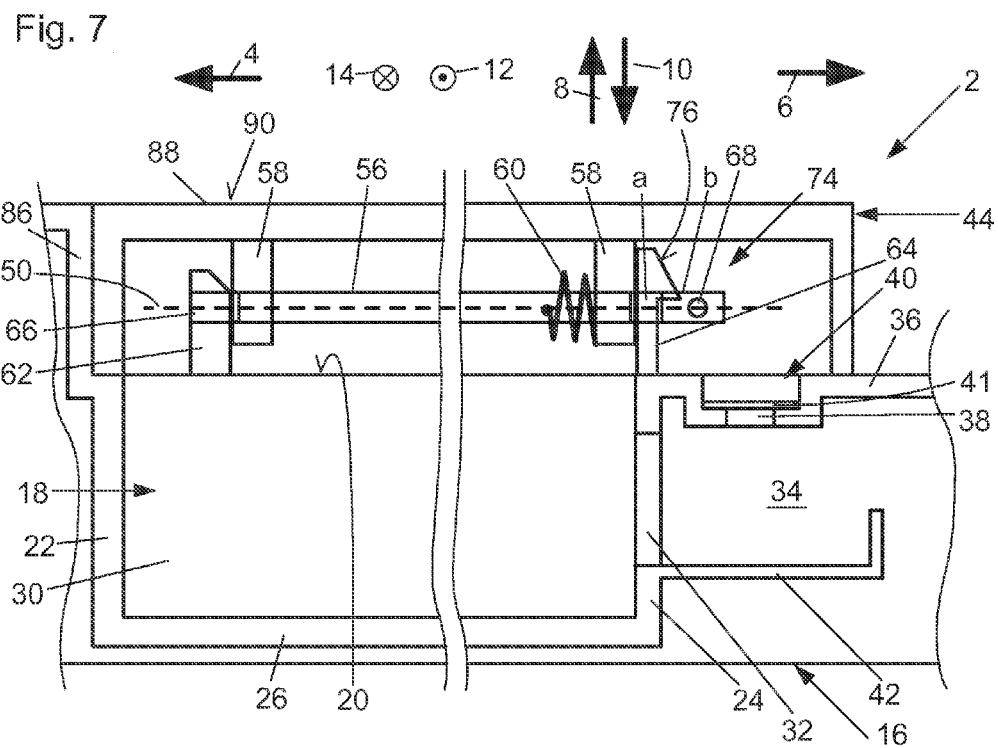

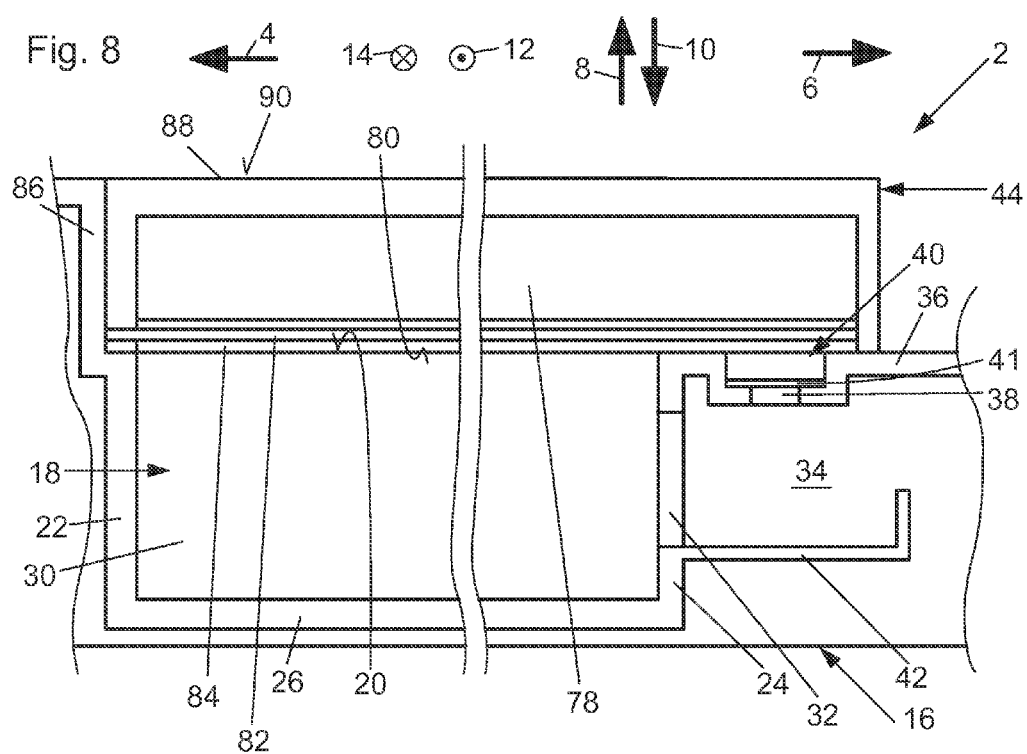

CENTER CONSOLE FOR A MOTOR VEHICLE AND MOTOR VEHICLE HAVING SUCH A CENTER CONSOLE

CROSS-REFERENCE TO RELATED APPLICATION

This application claims priority to German Patent Application No. 102014008717.4, filed Jun. 18, 2014, which is incorporated herein by reference in its entirety.

TECHNICAL FIELD

The present disclosure provides a center console for a motor vehicle in which a basic body includes a stowage compartment with a stowage compartment aperture. The center counsel also includes a stowage compartment lid, which can be pivoted from a closed position, in which the stowage compartment lid covers the stowage compartment aperture, into an open position, in which the stowage compartment lid opens the stowage compartment aperture. The technical field furthermore relates to motor vehicles having such a center console.

BACKGROUND

From practice, center consoles for motor vehicles are generally known to include a basic body designed for arrangement in transverse direction between the vehicle seats within a seat row of a motor vehicle. A stowage compartment with a stowage compartment aperture faces upwards in height direction is provided in the basic body. In addition to this, the center console includes a stowage compartment lid, which can be pivoted from a closed position, in which the stowage compartment lid covers the stowage compartment aperture, into an open position, in which the stowage compartment lid opens the stowage compartment aperture in order to make possible loading and unloading the stowage compartment via the stowage compartment aperture. The stowage compartment lid in this case can be pivoted about a pivot axis extending in transverse direction of the basic body, i.e. in transverse direction of the motor vehicle, from the closed position into the open position, wherein the pivot axis extending in transverse direction is arranged in a rear region of the center console, that is behind the stowage compartment.

Such center consoles have the disadvantage that a vehicle occupant on the vehicle seat adjacent to the center console in transverse direction can open the stowage compartment lid only with difficulty or with increased effort. In particular when the vehicle seat in longitudinal direction is adjusted further towards the front. In addition to this it is difficult or nearly impossible for a vehicle occupant on a vehicle seat in longitudinal direction behind the center console, i.e. for example in the second seat row, to transfer the stowage compartment lid from the closed position into the closed position. In addition it has been shown that the stowage compartment lid in the event of a frontal or rear-end collision of the motor vehicle tends to pivot between the open position and the closed position. Even during a braking maneuver of the motor vehicle, the stowage compartment lid can unintentionally pivot between the open position and the closed position.

SUMMARY

In accordance with the present disclosure a center console for a motor vehicle is provided with a basic body having a stowage compartment with a stowage compartment aperture. A stowage compartment lid is provided for simplified handling of the stowage compartment lid. The present disclosure creates a motor vehicle with such an advantageous center console. In addition, other objects, desirable features and characteristics will become apparent from the subsequent summary and detailed description, and the appended claims, taken in conjunction with the accompanying drawings and this background.

An embodiment of the present disclosure relates to a center console for a motor vehicle. The center console includes a basic body, which can for example be formed as a plastic body. In the basic body, a stowage compartment with a stowage compartment aperture is provided, which in the installed state preferably faces upwards in height direction. In addition to this, the center console includes a stowage compartment lid which is connected to the basic body in such a manner that the stowage compartment lid can be pivoted from a closed position, in which the stowage compartment lid covers the stowage compartment aperture, into an open position, in which the stowage compartment lid opens the stowage compartment aperture. The basic body has a longitudinal direction, which in the installed state within the motor vehicle corresponds to the longitudinal direction, i.e. the forward direction and the reverse direction of the motor vehicle. The stowage compartment lid is arranged on the basic body in such a manner that the same can be pivoted about a first pivot axis extending in longitudinal direction of the basic body in a first pivot direction from the closed position into the open position.

Because of the fact that the stowage compartment lid can be pivoted about the first pivot axis extending in longitudinal direction of the basic body and not about a pivot axis extending in transverse direction of the basic body, in the first pivot direction from the closed position into the open position, the handling of the stowage compartment lid for the vehicle occupants on the vehicle seats adjacent to the center console in transverse direction is significantly simplified, especially since the stowage compartment lid can be particularly easily transferred from the closed position into the open position and from the open position into the closed position even when the vehicle seat that is adjacent to the center console in transverse direction is moved relatively far forward. Similarly, the vehicle occupants on a vehicle seat in longitudinal direction behind the center console, which can relatively easily transfer the stowage compartment lid both into the open position and also into the closed position. In addition to this, the stowage compartment is easily accessible in the open position of the stowage compartment lid even by the last mentioned vehicle occupants on the rear seat row. Because of the fact that the stowage compartment lid can be pivoted about a first pivot axis extending in longitudinal direction of the basic body from the closed position into the open position and vice versa, it is additionally ensured that the stowage compartment lid during a braking maneuver of the motor vehicle does not unintentionally close, that is transferred from the open position into the closed position. Even during a frontal or rear-end collision of the motor vehicle it is ensured that the stowage compartment lid is not unintentionally transferred from the one position into the other position.

In a preferred embodiment of the center console according to the present disclosure, the stowage compartment lid can be pivoted furthermore about a second pivot axis extending in longitudinal direction of the basic body in a second pivot direction that is opposite to the first pivot direction from the closed position into the open position.

This has the advantage that the handling of the stowage compartment lid both for a vehicle occupant on a vehicle seat that is adjacent to the center console in the one transverse direction as well as for a vehicle occupant on a vehicle seat that is adjacent to the center console in the opposite transverse direction is simplified. The vehicle occupants can also easily reach the stowage compartment on both sides of the center console in the respective open position of the stowage compartment lid, which makes possible simple loading and unloading of the stowage compartment via the stowage compartment aperture.

In an advantageous embodiment of the center console according to the present disclosure, the second pivot axis is spaced from the first pivot axis in transverse direction of the basic body. The transverse direction of the basic body in this case preferably corresponds to the transverse direction of the motor vehicle in the installed state of the center console within the motor vehicle.

According to a further advantageous embodiment of the center console according to the present disclosure, the second pivot axis is arranged parallel to the first pivot axis in order to achieve similar pivoting behavior of the stowage compartment lid in the two pivot directions that are opposed to one another, i.e. the first pivot direction and the second pivot direction.

In order to achieve a compact construction and securely hold the stowage compartment lid in the closed position, the stowage compartment lid in a further advantageous embodiment of the center console according to the present disclosure can be releasably locked to the basic body in the closed position in the region of the first pivot axis. Alternatively or complementarily, preferably complementarily, the stowage compartment lid with this embodiment can be releasably locked on the basic body in the closed position in the region of the second pivot axis.

In order to further simplify handling the stowage compartment lid, the stowage compartment lid in a further advantageous embodiment of the center console according to the present disclosure can be automatically locked by pivoting into the closed position. Consequently the vehicle occupant is not forced to transfer the stowage compartment lid into the closed position and to lock the same in the closed position in a further handling step.

In order to ensure both a simple exchangeability of the stowage compartment lid as well as a simple assembly of the same on the basic body within the scope of the production, the stowage compartment lid in a particularly preferred embodiment of the center console according to the present disclosure can be removed from the basic body through unlocking both in the region of the first and also in the region of the second pivot axis.

In a further advantageous embodiment of the center console according to the present disclosure, at least one of the two pivot axes, i.e. the first pivot axis or the second pivot axis, is formed by a longitudinal brace. The longitudinal brace is preferably formed in one piece or/and from metal. With this embodiment it is preferred when both the first pivot axis and also the second pivot axis are each formed by a longitudinal brace.

In a particularly advantageous embodiment of the center console according to the present disclosure, the respective longitudinal brace is arranged on the basic body or the stowage compartment lid in such a manner that the same can be transferred or moved from a locking position, in which the stowage compartment lid is locked in the region of the respective pivot axis, into a release position, in which the stowage compartment lid is released from the basic body in the region of the respective pivot axis. The longitudinal brace thus does not only serve for forming the respective pivot axis, the moveable longitudinal brace rather serves also for locking the stowage compartment lid, on that additional locking means can be omitted and a particularly space-saving and compact construction is achieved.

In order to further augment the advantage of a space-saving and compact construction and additionally create a secure locking mechanism, the longitudinal brace in a further preferred embodiment of the center console according to the present disclosure is formed in such a manner that the same can be shifted in longitudinal direction of the basic body, consequently in its extension direction, from the locking position into the release position and vice versa.

According to a further advantageous embodiment of the center console according to the present disclosure, the longitudinal brace is preloaded in its locking position in order to realize the previously mentioned automatic locking of the stowage compartment lid by it being pivoted into the closed position. Here it has proved to be advantageous when a spring element for preloading the longitudinal brace in its locking position is provided. The spring element preferably is a coil spring surrounding the respective longitudinal brace so that the spring element can be arranged particularly space-savingly on the center console.

As already indicated before, the longitudinal brace can be arranged on the stowage compartment lid or on the basic body. In a further advantageous embodiment of the center console according to the present disclosure, the longitudinal brace on the one hand is moveably, if appropriate shiftably arranged on the stowage compartment lid or the basic body and on the other hand can be support is supported on a front and rear bearing on the other component, i.e. the basic body or the stowage compartment lid. Because of this, a particularly simple and space-saving hinge is created, wherein it is preferred when between the front and rear bearing on the basic body or the stowage compartment lid no further bearings for supporting are provided in order to create a particularly simple, compact and space-saving construction.

In a further preferred embodiment of the center console according to the present disclosure, the longitudinal brace is supported in the locking position locking the stowage compartment lid on the front and rear bearing and in the release position, released from the front and rear hearing.

In a further advantageous embodiment of the center console according to the present disclosure, at least one forced guide is provided, by means of which the longitudinal brace during the pivoting of the stowage compartment lid into the closed position against the preload force can be transferred from the locking position into the release position in order to make possible transferring the stowage compartment lid into the closed position and subsequent automatic returning of the longitudinal brace into the locking position locking the stowage compartment lid in the closed position.

In order to achieve a particularly secure mechanism for forced guidance, the previously mentioned forced guide in a further advantageous embodiment of the center console according to the present disclosure has a protruding attachment on the longitudinal brace and a sloping support surface on the basic body or the stowage compartment lid, along which the protruding attachment can be shiftably supported. The protruding attachment can for example be a step on the longitudinal brace, but with respect to the production it is preferred when the protruding attachment is formed by a support pin on the longitudinal brace. Such a support pin can for example be introduced into a transverse bore within the longitudinal brace, while it is preferred when the support pin protrudes over the longitudinal brace on both sides so that logically two protruding attachments are created, which should be supportable in corresponding manner on two sloping support surfaces spaced from one another on the basic body or the stowage compartment lid in order to achieve a particularly secure and purposeful forced guidance.

In principle, the previously mentioned sloping support surface can be arranged on the basic body or the stowage compartment lid as desired, but for the sake of space saving and compact construction it is preferred when the sloping support surface is provided in the region of one of the bearings or on one of the bearings proper.

In order to avoid having to directly actuate the longitudinal brace for releasing the stowage compartment lid in the region of the respective pivot axis, a manually actuatable actuating element for transferring the longitudinal brace from the locking position into the release position is provided in a further advantageous embodiment of the center console according to the present disclosure. Here, the actuating element is preferably designed in such a manner that it is shiftable in transverse direction of the basic body, i.e. in the installed state of the center console within the motor vehicle also in transverse direction of the motor vehicle, so that the handling by a vehicle occupant on one of the vehicle seats arranged in transverse direction next to the center console is clearly simplified. Here it is preferred when each of the longitudinal braces is assigned a separate, manually actuatable actuating element, wherein the two actuating elements are then preferably arranged on sides of the center console located opposite one another in transverse direction in order to optimize their accessibility from the respective vehicle seat.

In a further advantageous embodiment of the center console according to the present disclosure, the movement of the actuating element is coupled to the movement of the longitudinal brace via a forced guide. Accordingly, a protruding attachment or stop can be provided for example on the longitudinal brace, which interacts with a sloping support surface on the actuating element or vice versa, in order to convert the movement of the actuating element in transverse direction into a movement of the longitudinal brace in longitudinal direction and vice versa.

In a further particularly advantageous embodiment of the center console according to the present disclosure, a receptacle with a receptacle aperture is provided in the stowage compartment lid, which faces the stowage compartment aperture in the closed position of the stowage compartment lid. In this way, the receptacle, which is likewise formed as a recess, either serves for enlarging the stowage compartment or the receptacle can form a receptacle compartment that is separate from the stowage compartment. Accordingly, it is preferred with this embodiment when a receptacle lid is provided, which can be transferred from an open position, in which the receptacle aperture is covered, into a closed position, in which the receptacle lid opens the receptacle aperture.

In a further preferred embodiment of the center console according to the present disclosure, the previously mentioned receptacle lid can be shifted within the stowage compartment lid from the closed position into the open position for covering the receptacle. Accordingly, lateral guides can be provided on the wall of the receptacle for example in order to be able to shift the receptacle lid in corresponding manner from the closed position into the open position and vice versa.

In order to make possible a particularly secure arrangement of the receptacle lid in its closed position, engagement means are provided, by means of which the receptacle lid is releasably locked in its closed position. Accordingly, lateral engagement elements or engagement lugs can be provided on the receptacle lid which interact with corresponding engagement recesses on the stowage compartment lid or vice versa.

In a further particularly preferred embodiment of the center console according to the present disclosure, the receptacle lid is arranged on the stowage compartment lid in such a manner that the receptacle lid can be exclusively transferred from the closed position into the open position with a stowage compartment lid that has been removed or released from the basic body. This can be achieved in that a section of the basic body of the center console is arranged in such a manner that the same, independently of the pivot position of the stowage compartment lid, prevents transferring the receptacle lid from the closed position into the open position in which the receptacle lid on this section of the basic body of the center console could be supportable during the attempt of the transfer into the open position. Accordingly, the receptacle is suitable in particular in order to receive first aid material, reflective vests or similar, wherein the stowage compartment lid released from the basic body logically forms a mobile first aid kit. Consequently, the stowage compartment lid in this embodiment has a dual function so that an additional first aid kit claiming installation space could be omitted. Moreover, it is ensured because of the fact that the receptacle lid can be transferred from the closed position into the open position exclusively with removed stowage compartment lid that the receptacle lid in the event of an accident, a braking maneuver or a comparable vehicle maneuver is not unintentionally opened or transferred into the open position.

Usually, the basic body of a center console surrounds a larger interior space which is only partly used by the stowage compartment and other components of the motor vehicle. In order to be able to likewise optimally utilize the remaining interior space, an aperture is provided in a further advantageous embodiment of the center console according to the present disclosure in a front or rear wall bounding the stowage compartment, via which an interior space of the basic body is accessible and can thus likewise be utilized as stowage space. Here it is preferred when a covering wall of the basic body covering the interior space in height direction is provided, which includes a removal aperture. Accordingly, by way of the aperture in the front or rear wall bounding the stowage compartment, the interior can be easily filled with items such as for example a paper bag dispenser, in order to be able to comfortably remove these items such as for example tissue paper via the removal aperture in the covering wall of the basic body, wherein the items are otherwise safely concealed by the covering wall. Here it is preferred furthermore when the removal aperture is provided in a recess in the covering wall. This recess can be formed as a receptacle that is opened towards the top in height direction in order to arrange small items therein, which can be accessed relatively quickly. Alternatively or complementarily it is preferred when a detachable insert is provided, which covers the removal aperture if required or can be removed when using the removal aperture. In this embodiment it is additionally preferred when the removal aperture in the closed position of the stowage compartment lid is likewise covered by the stowage compartment lid, which if appropriate applies also to the recess in the covering wall that may be provided.

In a further advantageous embodiment of the center console according to the present disclosure, the stowage compartment aperture faces upwards in height direction. In this case the height direction of the center console is meant, which in the installed state of the center console within the motor vehicle, to correspond to the height direction of the motor vehicle.

According to a further advantageous embodiment of the center console according to the present disclosure, an armrest surface is provided on the side of the stowage compartment lid facing upwards in height direction in the closed position. Consequently, the stowage compartment lid equally serves as armrest for a vehicle occupant on a vehicle seat adjacent to the center console in transverse direction, so that an additional armrest or similar can be omitted. The armrest surface in this case is preferably formed from a material which is more elastic or/and softer than the material of the basic body or/and of the further components of the stowage compartment lid.

An embodiment of the motor vehicle according to the present disclosure includes a center console of the type according to the present disclosure.

In a preferred embodiment of the motor vehicle according to the present disclosure, the center console is arranged in transverse direction between the vehicle seats of the first seat row.

In an advantageous embodiment of the motor vehicle according to the present disclosure, the longitudinal direction of the center console corresponds to the longitudinal direction of the motor vehicle.

BRIEF DESCRIPTION OF THE DRAWINGS

The present disclosure will hereinafter be described in conjunction with the following drawing figures, wherein like numerals denote like elements.

FIG. 4 a partial lateral view of the center console from FIG. 1 in sectioned representation with the stowage compartment lid in the closed position;

FIG. 5 the center console from FIG. 4 with the stowage compartment lid in a partial open position;

FIG. 6 the center console from FIG. 4 with the stowage compartment lid during the transferring from the open position into the closed position or vice versa;

FIG. 7 the center console from FIG. 6 on reaching the closed position or prior to the transferring into the open position of the stowage compartment; and FIG. 8 a lateral view of the center console from the preceding figures in sectioned representation.

DETAILED DESCRIPTION

Figure 1:
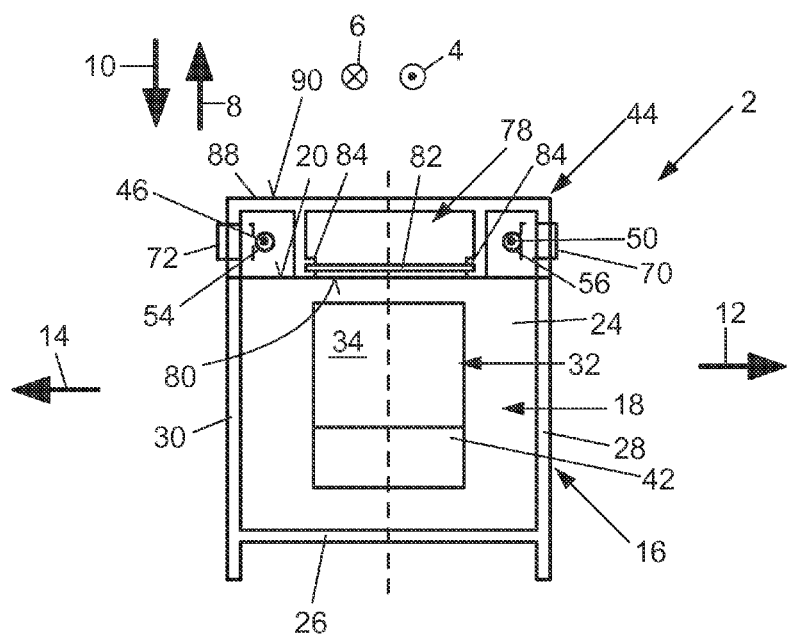
FIG. 1 a front view of an embodiment of the center console according to the present disclosure with the stowage compartment lid in the closed position in sectioned representation.

The following detailed description is merely exemplary in nature and is not intended to limit the invention or the application and uses of the invention. Furthermore, there is no intention to be bound by any theory presented in the preceding background of the invention or the following detailed description.

FIGS. 1-8 show an embodiment of the center console 2 for a motor vehicle according to the present disclosure. In the figures, the longitudinal directions 4, 6 opposing one another, the height directions 8, 10 opposing one another, and the transverse directions 12, 14 opposing one another are indicated by means of corresponding arrows. The mentioned directions of the center console 2 in the installed state of the same within a motor vehicle correspond to the directions of the motor vehicle, so that the longitudinal direction 4 is the forward direction of the motor vehicle. In the installed state of the center console 2, the same is arranged in transverse direction 12, 14 between the vehicle seats of a seat row which is not shown in more detail, preferably of the first seat row.

The center console 2 includes a basic body 16 preferably fabricated from plastic. The center console 2 is formed elongated in the longitudinal directions 4, 6. Within the basic body 16, a stowage compartment 18 with a stowage compartment aperture 20 facing upwards in height direction 8 is provided. In longitudinal direction 4, the stowage compartment 18 is bounded by a front wall 22, in longitudinal direction 6 by a rear wall 24, in height direction 10 downwards by a floor wall 26 and in the transverse directions 12, 14 by a side wall 28, 30 each.

In the rear wall 24, an aperture 32 is provided, via which an interior space 34 in the basic body 16, which in longitudinal direction 6 is arranged in the stowage compartment 18, is accessible. Moreover, the basic body 16 includes a covering wall 36 covering the interior space 34 in height direction 8, in which a removal aperture 38 is provided. The removal aperture 38 in this case is provided in a recess 40 in the covering wall 36, wherein in the recess 40 a detachable insert 42 is arranged, which serves for covering the removal aperture 38 when the removal aperture 38 is not needed. As is evident furthermore from FIG. 4, the stowage compartment lid which is described in more detail later on is designed in such a manner that it covers the removal aperture 38 and the recess 40 in height direction 8 in the closed position.

From FIG. 4 it is evident furthermore that the basic body 16 also includes a support section 42 which is preferably offset upwards in height direction 8 relative to the floor wall 26, so that an item introduced into the interior space 34 via the aperture 32 can be supported downwards in height direction 10 on the support section 42 and is accessible via the removal aperture 38 provided the stowage compartment lid 44 is opened and the insert 41 removed. The support section 42 in this case is preferably designed in such a manner that an item can be supported on the support section 42 also in longitudinal direction 6 on the support section 42 in order to prevent further entry of said item in longitudinal direction 6 towards the back into the interior 34.

The center console 2 includes a stowage compartment lid 44. The stowage compartment lid 44 can be pivoted from a closed position shown in FIG. 1, in which the stowage compartment lid 44 covers the stowage compartment aperture 20 upwards in height direction 8 into an open position, in which the stowage compartment lid 44 opens the stowage compartment aperture 20 so that the stowage compartment 18 can be loaded and unloaded via the stowage compartment aperture 20. Accordingly, the stowage compartment lid 44 on the one hand can be pivoted about a first pivot axis 46 extending in longitudinal direction 4, 6 of the basic body 16 in a first pivot direction 48 from the closed position according to FIG. 1 into the first open position according to FIG. 2. In addition to this, the stowage compartment lid 44 can be pivoted about a second pivot axis 50 extending in longitudinal direction 4, 6 of the basic body 16 in a second pivot direction 52 that is opposite to the first pivot direction 48 from the closed position according to FIG. 1 into the second open position according to FIG. 3. The two pivot axes 46, 50 are spaced from one another in transverse direction 12, 14 and arranged parallel to one another. The first and second pivot axis 46, 50 are each formed by a longitudinal brace 54, 56, wherein the further construction and the functionality of the longitudinal braces 54, 56 will be exemplarily described by means of the longitudinal brace 56 making reference to FIG. 1-7, wherein the description correspondingly applies to the longitudinal brace 54.

The longitudinal brace 56 extends, as is evident from the name, in the longitudinal directions 4, 6 and forms the second pivot axis 50 extending in longitudinal direction 4, 6. The longitudinal brace 56 in this case is preferably formed as a metal brace. The longitudinal brace 56 on the one hand is moveably arranged on the stowage compartment lid 44 via brackets 58. More precisely, the longitudinal brace 56 is arranged on the stowage compartment lid 44 via the brackets 58 in such a manner that the longitudinal brace 56 can be shifted relative to the stowage compartment lid 44 from the locking position shown in FIGS. 4 and 5 in longitudinal direction 6 into a release position shown in FIG. 7. Here, the longitudinal brace 56 is preloaded in the locking position, which is in longitudinal direction 4. For preloading the longitudinal brace 56 in the locking position, a spring element 60 is provided, which on the one hand is supported on one of the brackets 58 and on the other hand on a section of the longitudinal brace 56. In the shown embodiment, the spring element 60 is formed as a coil spring surrounding the longitudinal brace 56, wherein in the shown embodiment a coil compression spring is employed.

One the other hand, the longitudinal brace 56 can be supported or is supported on an in longitudinal direction 4 front bearing 62 and an in longitudinal direction 6 rear bearing 64 on the basic body 16, as is evident from FIG. 4, which shows the stowage compartment lid 44 in the closed position. When the stowage compartment lid 44 is in the mentioned closed position, the stowage compartment lid 44 is releasably locked in the region of the second pivot axis 50 in that the longitudinal brace 56 in the locking position according to FIG. 4 is supported on the front and rear bearing 62, 64. For the purpose of supporting, the end of the longitudinal brace 56 facing in longitudinal direction 4 dips into an aperture 66 of the bearing 62 while a protruding attachment 68 provided on the end of the longitudinal brace 56 in longitudinal direction 6 engages behind the rear bearing 64 from the bottom in height direction 10. The protruding attachment 68 in the shown embodiment is formed by a support pin inserted into a transverse bore, which protrudes on both sides, so that logically two protruding attachments 68 are provided, which accordingly engage behind two sections of the rear bearing 64.

Locking in the region of the rear bearing 64, however, need not necessarily or exclusively take place via the protruding attachment 68 or the support pin. It is rather preferred when the longitudinal brace has a taper (a), preferably formed by at least one, if appropriate two flats on both sides, via which the longitudinal brace 56 in the release position in height direction 10 and 8 respectively can be introduced into the rear bearing 64 or guided out of the same, while the taper a in the locking position of the longitudinal brace 56 is offset in longitudinal direction 4, 6 relative to the rear bearing in such a manner that the longitudinal brace 56 in the closed position of the stowage compartment lid 44 according to FIG. 4 is held in the rear bearing 64 in a positively joined manner. The rear bearing 64 for this purpose can fir example include an aperture in longitudinal direction 4, 6, which furthermore is opened upwards in height direction 8 via a tapered access aperture. It has proved advantageous when the taper a complements the protruding attachment 68 so that the taper a brings about locking with a particularly low play or even no play while the protruding attachment 68 exercises its function substantially in the forced guide 74 described in more detail later on. In principle, an attachment or shoulder (b) on the longitudinal brace 56 created as a matter of course could also take over the function of the protruding attachment 68. For ensuring a particularly securely functioning embodiment with the advantages mentioned above it is preferred however when the taper (a) and the protruding attachment 68 complement one another.

Figure 2:
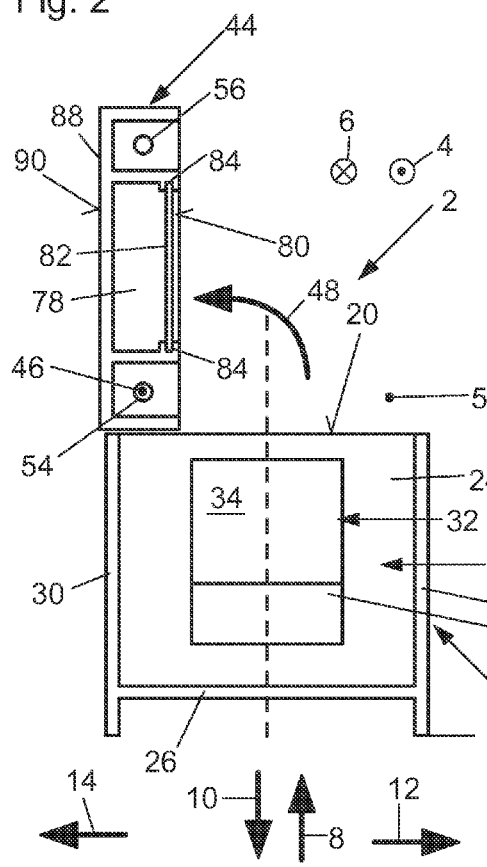
FIG. 2 the center console from FIG. 1 with the stowage compartment lid in a first open position.

When the stowage compartment lid 44 is to be pivoted about the first pivot axis 46 into the first open position according to FIG. 2, the longitudinal brace 56 can be shifted in longitudinal direction 6 against the preload force of the spring element 60 from the locking position according to FIG. 4 into the release position according to FIG. 7, in which the longitudinal brace 56 is released both from the front and also from the rear bearing 62, 64. More precisely, the end of the longitudinal brace 56 facing in longitudinal direction 4 in the release position no longer extends into the aperture 66 of the front bearing 62, while the taper a within the rear bearing 64 is arranged in such a manner that the longitudinal brace 56 can be guided out of the rear bearing 56 in height direction 8. Furthermore, the protruding attachment 68 no longer engages behind the rear bearing 64 as is evident in particular in FIG. 7. Consequently, the stowage compartment lid 44 is no longer locked in the region of the second pivot axis 50, the stowage compartment lid 44 is rather released from the basic body 16 in the release position of the longitudinal brace 56 in the region of the second pivot axis 50 so that the stowage compartment lid 44 starting out from the closed position in FIG. 7 can be pivoted about the first pivot axis 46 into the open position according to FIG. 2. Provided that the longitudinal brace 56 during the pivot operation is no longer shifted against the preload three into the release position, the same gradually assumes the positions shown in FIGS. 6 and 5 during the pivot operation, more so since the spring element 60 causes the resetting.

Figure 3:
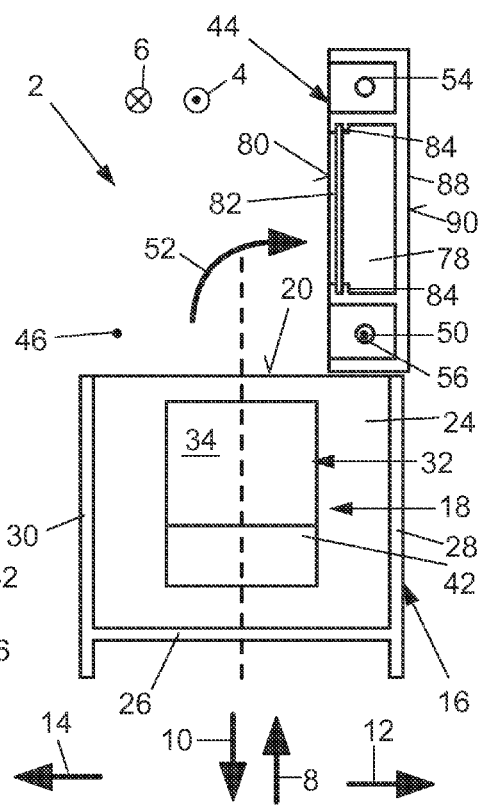
FIG. 3 the center console from FIG. 1 with the stowage compartment lid in a second open position.

In order to be able to shift the longitudinal brace 56 in the manner described before against the resetting force of the spring element 60 from the locking position according to FIG. 4 into the release position according to FIG. 7, a manually actuatable element 70 is provided, which serves for transferring the longitudinal brace 56 from the locking position into the release position. Here, the actuating element 70 is designed as an actuating element 70 that is shiftable in transverse direction 12, 14, wherein the movement of the actuating element 70 which is merely indicated schematically in FIG. 1-3, is coupled to the movement of the longitudinal brace 56 via a forced guide which is not shown in more detail. From FIG. 1-3 it is evident, furthermore, that a corresponding actuating element 72 is also provided for the longitudinal brace 54. The two actuating elements 70, 72 are arranged on sides of the center console 2 located opposite one another in transverse direction 12, 14, here of the stowage compartment lid 44 of the center console 2, so that the same are comfortably accessible from the respective transverse direction 14, 12.

The stowage compartment lid 44 is designed in such a manner that it is automatically locked again in the region of the second pivot axis 50 by pivoting from the first open position according to FIG. 2 into the closed position according to FIG. 1 as will be explained in the following. In the first open position according to FIG. 2, the longitudinal brace 56 is in the locking position hinted in FIG. 5. If the stowage compartment lid 44 is again pivoted from the first open position according to FIG. 2 in the direction of the closed position against the first pivot direction 48, a forced guide 74 acts in such a manner that the longitudinal brace 54 is moved or shifted against the preload force of the spring element 60 from the locking position via the intermediate position according to FIG. 6 into the release position according to FIG. 7. More precisely, the longitudinal brace 56 by means of the forced guide 74 is shifted in longitudinal direction 6 during the closing of the stowage compartment lid 44. Here, the forced guide 74 on the one hand includes the already mentioned protruding attachment 68, which is formed by a support pin, and on the other hand an sloping support surface 76 on the basic body 16, along which the protruding attachment 68 can be shiftably supported. In the shown embodiment, the sloping support surface 76 is formed in the region of the rear bearing 64, more precisely on the rear bearing 64. When the stowage compartment lid 44 reaches the closed position, as shown in FIG. 7, the preload force of the spring element 60 brings about shifting of the longitudinal brace 56 forward in longitudinal direction 4 so that the longitudinal brace 56 again assumes its locking position which was already described before and shown in FIG. 4.

As indicated in FIGS. 1-3 and 8, a receptacle 78 with a receptacle aperture 80 is additionally provided in the stowage compartment lid 44, which faces the stowage compartment aperture 20 in the closed position of the stowage compartment lid 44 shown in FIGS. 1 and 8. In addition to this, a receptacle lid 82 is provided, which can be transferred from an open position which is not shown in more detail, in which the receptacle aperture 80 is covered, into a closed position, in which the receptacle lid 82 opens the receptacle 78. More precisely, the receptacle lid 82 can be shifted from the closed position into the open position and vice versa, wherein for this purpose lateral guides 84 can be provided on the wall of the receptacle 78. An engagement element can also be provided on the guides 84 or/and the receptacle lid 82 by means of which the receptacle lid 82 is releasably engaged or/and locked in the closed position.

The stowage compartment lid 44 is designed in such a manner that it can be removed from the basic body 16 through unlocking both in the region of the first pivot axis 46 and also in the region of the second pivot axis 50. The releasing in the region of the first and second pivot axis 46, 50 can be brought about in the manner described above, namely by shifting both longitudinal braces 54, 56 from the locking position into the release position. The receptacle lid 82 in this case can be designed in such a manner that it cannot be shifted into the open position when the stowage compartment lid 44 is still locked in the region of at least one of the two pivot axes 46, 50. However, it has proved advantageous when the receptacle lid 82 can be transferred from the closed position into the open position exclusively with stowage compartment lid 44 removed, which can be brought about in that the freedom of movement of the receptacle lid 82 with a stowage compartment lid 44 locked on the basic body 16 is bounded by a section 86 of the basic body 16, as is exemplarily shown in FIG. 4-8. The section 86 is then preferably designed in such a manner that it prevents transferring the receptacle lid 82 from its closed position into its open position regardless of the position of the stowage compartment lid 44 locked on the basic body 16.

On the side 88 of the stowage compartment lid 44 facing upwards in height direction 8 in the closed position of the stowage compartment lid 44 an armrest surface 90 is provided. The armrest surface 90 is preferably formed by a material that is more elastic or/and softer than the material of the basic body 16 or/and of the further components of the stowage compartment lid 44. Consequently, the stowage compartment lid 44 in its closed position equally serves as armrest for one of the vehicle occupants.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A center console for a motor vehicle comprising:
a body portion having a stowage compartment aperture providing access to a stowage compartment;
a stowage compartment lid pivotable from a closed position, in which the stowage compartment lid conceals the stowage compartment aperture into a first open position, in which the stowage compartment lid reveals the stowage compartment aperture, wherein the stowage compartment lid can be pivoted about a first pivot axis extending in a longitudinal direction of the body portion in a first pivot direction from the closed position into the open position,
wherein the stowage compartment lid is pivotable about a second pivot axis extending in the longitudinal direction in a second pivot direction that is opposite to the first pivot direction from the closed position into a second open position, wherein the second pivot axis is arranged spaced in transverse direction from the first pivot axis, and
wherein the first and second pivot axes are formed by a longitudinal brace transferred from a locking position, in which the stowage compartment lid is locked in the region of the respective pivot axis, into a release position, in which the stowage compartment lid in the region of the respective pivot axis is released from the body portion.

2. The center console according to claim 1, wherein the second pivot axis is arranged parallel to the first pivot axis.

3. The center console according to claim 1, wherein the stowage compartment lid can be releasably locked on the body portion in the region of the first and second pivot axes when in the closed position, and unlocked from the body portion in the region of at least one of the first and second pivot axes.

4. The center console according to claim 3, wherein the stowage compartment lid is automatically locked on the body portion by pivoting into the closed position.

5. The center console according to claim 1, wherein the longitudinal brace is shiftable in longitudinal direction from the locking position into the release position and is preloaded in the locking position by a spring element operably coupled to the longitudinal brace.

6. The center console according to claim 5, wherein the longitudinal brace is shiftably arranged on one of the stowage compartment lid or body portion, and supported on a front and rear bearing on the other of the body portion or the stowage compartment lid, wherein the longitudinal brace is supported on the front and rear bearing when in the locking position and is released from the front and rear bearing when in the release position.

7. The center console according to claim 5, further comprising at least one forced guide provided by the longitudinal brace during the pivoting of the stowage compartment lid into the closed position can be transferred against the preload force from the locking position into the release position.

8. The center console according to claim 5, wherein the forced guide comprises a protruding attachment on the longitudinal brace and a sloping support surface on one of the body portion or the stowage compartment lid provided in the region of at least one of the front and rear bearings along which the protruding attachment is shiftably supported, wherein the sloping support surface.

9. The center console according to claim 5, further comprising an actuating element configured to shift in transverse direction for transferring the longitudinal brace from the locking position into the release position, wherein the forced guide couples movement of the actuating element to the movement of the longitudinal brace.

10. A center console for a motor vehicle comprising:
a body portion having a stowage compartment aperture providing access to a stowage compartment;
a stowage compartment lid pivotable from a closed position, in which the stowage compartment lid conceals the stowage compartment aperture into a first open position, in which the stowage compartment lid reveals the stowage compartment aperture, wherein the stowage compartment lid can be pivoted about a first pivot axis extending in a longitudinal direction of the body portion in a first pivot direction from the closed position into the open position,
wherein the stowage compartment lid is pivotable about a second pivot axis extending in the longitudinal direction in a second pivot direction that is opposite to the first pivot direction from the closed position into a second open position, wherein the second pivot axis is arranged spaced in transverse direction from the first pivot axis, and
wherein the stowage compartment lid comprises a receptacle with a receptacle aperture, which faces the stowage compartment aperture in the closed position of the stowage compartment lid.

11. A center console for a motor vehicle comprising:
a body portion having a stowage compartment aperture providing access to a stowage compartment;
a stowage compartment lid pivotable from a closed position, in which the stowage compartment lid conceals the stowage compartment aperture into a first open position, in which the stowage compartment lid reveals the stowage compartment aperture, wherein the stowage compartment lid can be pivoted about a first pivot axis extending in a longitudinal direction of the body portion in a first pivot direction from the closed position into the open position,
wherein the stowage compartment lid is pivotable about a second pivot axis extending in the longitudinal direction in a second pivot direction that is opposite to the first pivot direction from the closed position into a second open position, wherein the second pivot axis is arranged spaced in transverse direction from the first pivot axis, and
wherein the stowage compartment lid further comprises a receptacle lid, which can be transferred from an open position, in which the receptacle lid conceals the receptacle aperture, into a closed position, in which the receptacle lid reveals the receptacle aperture, wherein the receptacle lid is releasably locked in the closed position by a second engagement element.

12. The center console according to claim 11, wherein the receptacle lid is positionable from the closed position into the open position exclusively with the stowage compartment lid removed.

13. The center console according to claim 1, wherein an aperture is formed in one of a front wall or a rear wall of the body portion bounding the stowage compartment to provide access to an interior space of the body portion.

14. The center console according to claim 13, further comprising a covering wall of the body portion covering the interior space in a height direction and a removal aperture provided in a recess in the covering wall, wherein the recess is covered by at least one of an insert and the stowage compartment lid in the closed position.

15. The center console according to claim 1, further comprising an armrest surface on a surface of the stowage compartment lid opposite the stowage compartment aperture facing upwards in height direction in the closed position.

16. A motor vehicle comprising a first seat row having a pair of first seats and a center console according to claim 1, wherein the center console is arranged in a transverse direction between the pair of first seats and in a longitudinal direction, wherein the transverse and longitudinal directions corresponds to the motor vehicle.

* * * * *